United States Patent [19]
Hall et al.

[11] 3,958,590
[45] May 25, 1976

[54] PACKAGE

[75] Inventors: Richard H. Hall, Midland; Daniel H. Haigh, Sanford, both of Mich.

[73] Assignee: The Dow Chemical Company, Midland, Mich.

[22] Filed: Dec. 12, 1974

[21] Appl. No.: 532,129

[52] U.S. Cl. .............................. 137/172; 210/489; 210/500 R; 137/204
[51] Int. Cl.² .......................................... B01D 13/00
[58] Field of Search ......... 137/172; 210/489, 493 R, 210/493 B, 289, 500 R

[56] References Cited
UNITED STATES PATENTS

| | | | |
|---|---|---|---|
| 2,463,327 | 3/1949 | Snell | 210/289 |
| 2,682,268 | 6/1954 | Ryan | 210/289 X |
| 2,802,573 | 8/1957 | Weatherly | 210/489 X |
| 3,290,870 | 12/1966 | Jensen | 210/489 X |
| 3,750,688 | 8/1973 | Hall | 137/172 X |

Primary Examiner—Alan Cohan
Attorney, Agent, or Firm—R. B. Ingraham

[57] ABSTRACT

A package which comprises a conventional sheet metal can having a bottom and top which is joined to a tubular body by means of peripheral crimps about the periphery of the top and bottom is provided wherein a flexible plastic foam is disposed beneath the ends of the container and between the container and the crimped edge portions. The foam provides a seal in the regions of the crimping and acts as a retainer for particulate material within the package. The construction is particularly useful for imbiber bead valves.

9 Claims, 2 Drawing Figures

PACKAGE

Valves are known which contain a permeable bed of particulate swellable polymer which imbibes organic liquid materials and on contact therewith will swell to provide a positive shut-off. Such beads in admixture with an inert filler provide a desirable filter bed for the removal of organic liquids from aqueous streams. Such valves are commercially available and are described in U.S. Pat. No. 3,750,688 the teaching of which is herewith incorporated by reference. One particularly desirable form of imbiber bead valve is a single use valve which consists of a cylindrical sheet steel container or tin can having a threaded fitting at one end and a perforate bottom. At both top and bottom of the can are dispersed foraminous inserts which serve to retain the particulate bed within the body of the container. Such valves are particularly satisfactory for the draining of water from fuel storage tanks. Advantageously, such a valve by means of its threadable connection is connected to a water drain or dip line on a fuel storage tank, such as, a gasoline storage tank. The drain valve of the gasoline storage tank is opened and water drained therefrom through the imbiber bead valve. When the water has drained from the tank and gasoline or other fuel such as diesel fuel or so-called number two fuel oil contacts the particulate swellable polymer particles within the valve, the beads or particles rapidly swell to an extent sufficient to prevent further flow of liquid therethrough. Thus an imbiber bead valve may be connected to a fuel storage tank, the drain valve opened and the water permitted to drain therefrom without the constant attendance of a workman to assure that significant quantities of the fuel is not discharged to the environment. Employing such valves, many tanks can be drained simultaneously by one person rather than requiring the individual attention of a workman while the tank is being drained. Such valves in the past have been prepared by providing a can body with a perforate end or bottom, adding a foraminous bed such as felt, polyurethane foam or coarse fibers or the like, adjacent to the perforate end, adding a desired quantity of swellable particles to the body, applying a like bed adjacent the other open end of the container and crimping a sheet metal top portion to the container. The sheet metal top portion has a suitable threaded connector thereon. Generally it is necessary to provide a gasketing material in the region where the threaded end of the container is crimped to the body of the container in order to prevent hydrocarbon leaks, such as gasoline when the fuel contacts the swellable particles and the imbiber bead valve closes to prevent further flow.

It would be desirable if there were available an improved method for the fabrication of containers having disposed therein particular solids.

It would also be desirable if there were available an improved method for the preparation of imbiber bead valves.

It would also be desirable if there were available an improved simplified construction of a container containing particular solids and having an aqueous liquid permeable organic liquid impermeable bed therein.

These benefits and other advantages in accordance with the present invention are achieved in a package, the package comprising a container, the container having a tubular body, the container body having a first end and a second end and a passageway extending therebetween, the container body defining a first body opening and a second body opening in full communication with the passageway, a first closure member affixed to the first end of the container body, a body of flexible synthetic resinous open cell foam disposed at the first end of the body and being generally coextensive with the first opening, a peripheral portion of the flexible synthetic resinous open cell foam being disposed between the first end of the body and the first enclosure and compressed between the closure and the body to form a liquid tight seal.

Also contemplated within the scope of the present invention is a method for the fabrication of a package, the method comprising providing a container body, the container body having a first end, a second end, a first container body opening in the first end and a second container body opening at the second end, a first closure adapted to engage the first end of the body and to cover the first opening thereof providing a flexible synthetic resinous open cell foam over the first opening of the body and applying to the first opening of the body a first end closure, compressing the synthetic resinous open cell foam immediately adjacent to the body of the closure to form a liquid tight seal and affixing the closure to the body.

Further features and advantages of the present invention will become more apparent when the following specification is taken in connection with the drawing wherein the Figure schematically depicts a container in accordance with the present invention.

Figure 1:
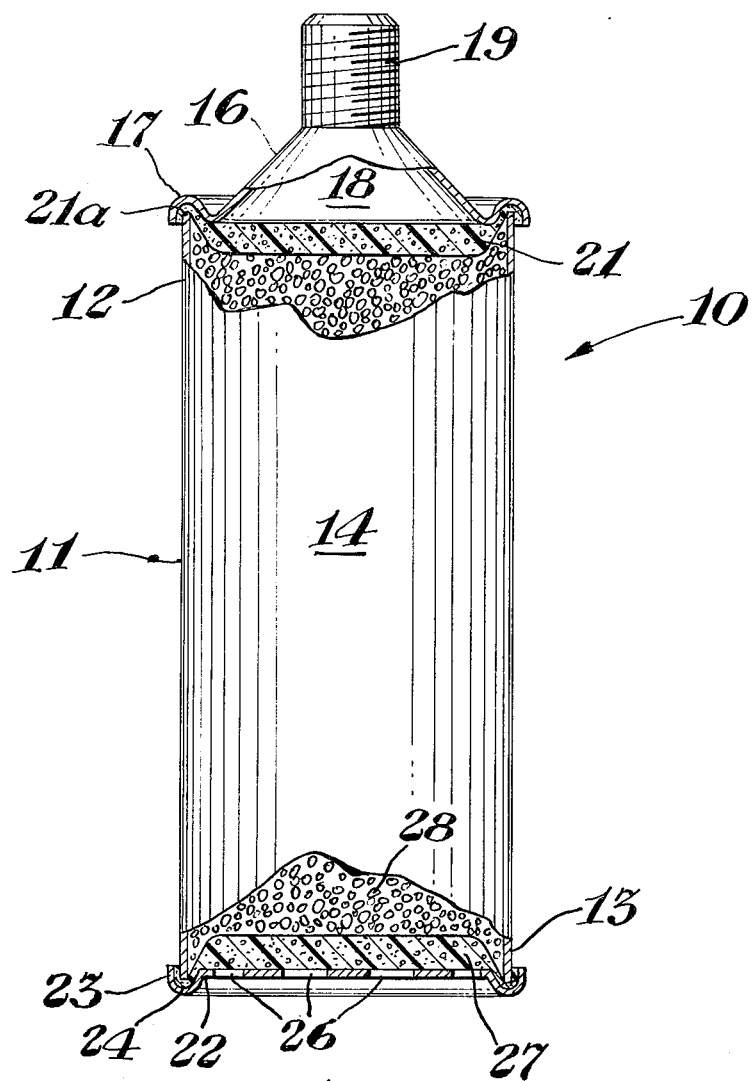
FIG. 1 is a partly in section view of package in accordance with the invention.
Figure 2:
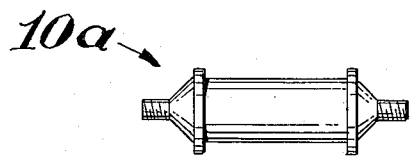
FIG. 2 is a view of an alternate embodiment of the invention.

In FIG. 1 there is schematically depicted a partly in-section view of a container in accordance with the present invention generally designated by the reference numeral 10. The container 10 has a generally tubular body 11, the body 11 has a first end 12 and a second end 13. Beneficially the body 11 is of sheet metal. Defined within the body 11 is a passageway 14 which extends from the first end 12 to the second end 13 and provides communication between each of the ends. A first closure member 16 is disposed adjacent the first end 12. The closure member 16 has a peripheral crimp region 17 which is attached to engage the end 12 and crimped thereon. The first closure 16 defines a passageway 18 which provides full communication between the passage 14 and space external to the container 10. A connecting means or threaded connector 19 is defined by the first closure 16, the threaded connector 19 permits liquid tight communication to be made between the closure 16 and a source of liquid (not shown). A synthetic resinous flexible open cell foam member 21 extends generally across the first end 12 of the body 11 and has a configuration generally commensurate with the cross sectional configuration of the passageway 14. The foam body 21 has a peripheral or collapsed portion 21a disposed within the crimp 17 of the first closure 16. The region 21a is collapsed and compressed to provide a liquid tight seal between the passageways 14, 18 and the space external to the body 11. A second closure 22 is disposed adjacent the second end 13 of the body 11. The closure 22 is a generally planar configuration and has a peripheral region 23 which defines an annular recess or crimp 24. The portion 23 is of generally U-shaped cross section configuration and forms a crimp to engage the second end 13 of the body 11. A second synthetic resinous liquid permeable open cell foam body 27 is disposed across the second end 13 of the body 11 and is compressed in the region of the peripheral portion 23. The closure 22 defines a plurality of passageways 26 which provide full communication between passageway 14 and space external to the body 11. Alternately the closure such as closure 22 may be generally similar to or identical with the closure 16 to provide a threaded fitting at each end of the container as depicted in FIG. 2 and designated by the reference numeral 10a. Disposed within the passageway 14 is a particulate bed 28. Beneficially the bed 28 comprises a plurality of organic liquid swellable polymer particles.

In operation of the container 10 in accordance with the present invention the threaded connector 19 is connected to a source of an aqueous stream, the aqueous stream passes through the passageway 18, through the foam member 21, through the bed 28 in the passage 14, and is discharged through the openings 26 of the second closure 22. Beneficially trace amounts of oil or other imbibable organic liquids are imbibed by the particles making up the particulate bed and usually in cases where the organic contaminant is gasoline or number 2 fuel oil. The effluent from the opening 26 has, to the average person, no odor of fuel oil or gasoline. When sufficient organic liquid enters the bed 28 the particles swell and prevent passage of liquid through the bed. Containers in accordance with the present invention are readily prepared using conventional can crimping equipment. The only additional step required is to dispose a flexible open cell synthetic resinous foam over the end which is to receive the closure prior to positioning the closure and crimping it thereon.

A wide variety of synthetic resinous foams may be employed; particularly desirable for most applications are the open cell polyurethane foams commonly used for upholstery, packaging, thermal insulation, and clothing. The thickness of such foam may be varied to meet the special needs of a particular application. For use in imbiber bead valves foams having a density of 2–6 pounds per cubic foot are desirable and are usually used in thicknesses varying from ¼ inch to about ½ inch. However a thinner or thicker foam may be employed depending upon the specific need. The pressure exerted by the crimping machine is more than adequate to compact the foam and provide the desired hermetic seal. Although the container in FIG. 1 is shown as having the flexible open cell foam body disposed at each end of the container, only the foam member 21 provides the required seal to prevent leakage of the hydrocarbon or organic liquid materials. The foam body 27 disposed at the second end of the container provides a convenient means of retaining the particles of the bed 28 and preventing passage of these particles through the opening 26 of the closure 22. A wide variety of polymer particles are useful in the practice of the present invention and are described in U.S. Pat. No. 3,750,688. Although the containers have been described as sheet metal, threaded pipes or molded plastic bodies and end caps or closures may be employed. Such a container may be used as a cartridge for use within a housing and maintained in sealing relation therewith by suitable gaskets in a manner such as is employed with automotive oil filters.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a package, the package comprising a container, the container having a tubular body, the container body having a first end and a second end and a passageway extending therebetween, the container body defining a first body opening and a second body opening in full communication with the passageway, a first closure member affixed to the first end of the container body, a body of flexible synthetic resinous open cell foam disposed at the first end of the body and being generally coextensive with the first opening, a peripheral portion of the flexible synthetic resinous open cell foam being disposed between the first end of the body and the first closure and compressed between the closure and the body to form a liquid tight seal.

2. The package of claim 1 having disposed therein a particulate solid.

3. The package of claim 2 wherein the particulate solid is an organic liquid swellable polymer.

4. The package of claim 1 wherein the second end of the container body has disposed thereon a flexible synthetic resinous open cell foam generally coextensive with the second opening, the peripheral portion of the flexible synthetic resinous open cell foam being disposed between the second end of the body and a second closure and compressed between the second closure and the body to form a liquid tight seal.

5. The package of claim 1 wherein the container comprises a sheet metal body having a sheet metal first closure member, the first closure member being adapted to threadably engage a conduit and provide communication between the conduit and the passageway of the body.

6. The package of claim 5 wherein the second closure member is adopted to threadably engage a conduit and provide connection therewith.

7. A method for the fabrication of a package, the method comprising providing a container body, the container body having a first end, a second end, a first container body opening in the first end and a second container body opening at the second end, a first closure adapted to engage the first end of the body and to cover the first opening thereof, providing a flexible synthetic resinous open cell foam over the first opening of the body and applying to the first opening of the body the first end closure, compressing the synthetic resinous open cell foam immediately adjacent to the body of the closure to form a liquid tight seal and affixing the closure to the body.

8. The method of claim 7 including the step of providing within the body a liquid swellable polymer in particulate form.

9. The method of claim 7 including the step of applying to the second end of the container body a second closure disposing between the second closure and the body defining the second container body opening an open cell flexible synthetic resinous foam and compressing the synthetic resinous open cell foam between the second closure and the container adjacent the second container body opening.

* * * * *